Patented Dec. 1, 1953

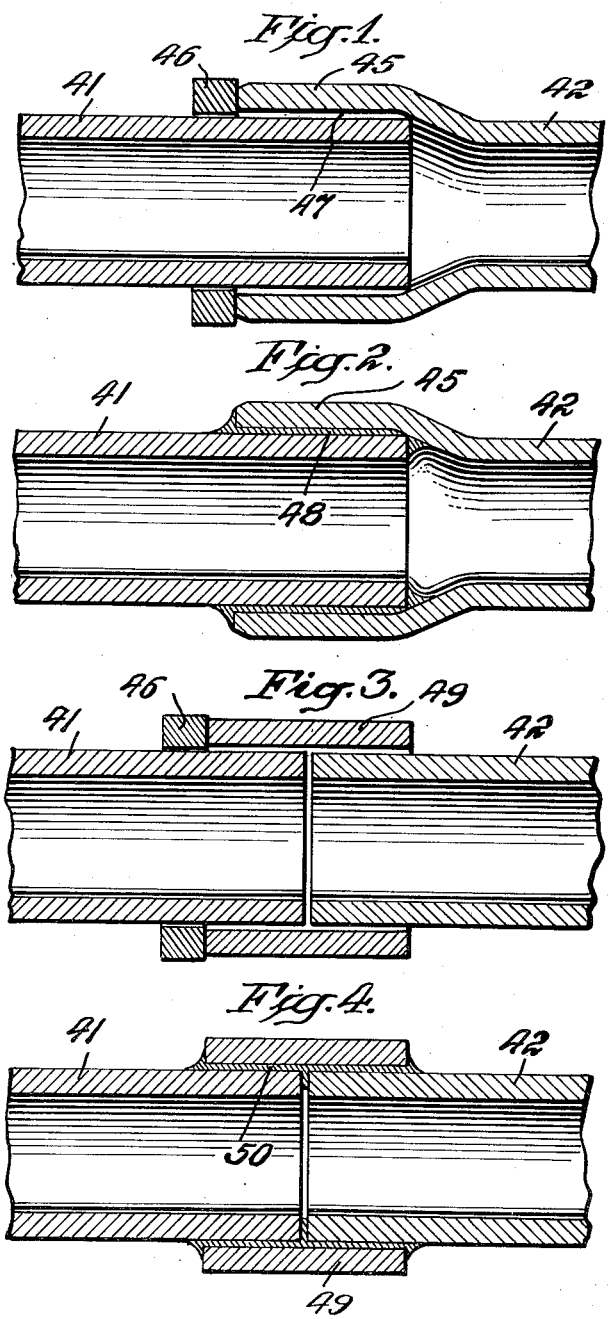

2,661,282

UNITED STATES PATENT OFFICE 2,661,282

IRON-PHOSPHORUS BRAZING COMPACT

Bernard A. Daley, Scott Township, Vanderburgh County, Ind., assignor to Servel, Inc., New York, N. Y., a corporation of Delaware Application October 28, 1949, Serial No. 123,998

1 Claim. (Cl. 75—123)

My invention relates to a brazing compound and more particularly to the structural formation of a brazing compound for use in production of ammonia refrigerating apparatus as described in United States Patent No. 2,487,001.

A principal problem presented in production of refrigeration apparatus as described in said patent is the physical structure of the brazing or joint sealing composition. In the instance of an iron-phosphorus alloy, it is known to provide the alloy in powdered form mixed with a binder to form a paste for application at a joint before brazing. This requires considerable labor for application and control. Wire forms, as in copper brazing, are not feasible because of the brittleness of the subject type of alloy. In attempting to solve this problem, I first resorted to the knowledge of metallurgy and tried to obtain a shape by compacting the powdered alloy. This was found unsatisfactory because the resulting molded form is too fragile. This could be overcome by sintering, but this is not economically practical because the fragility is such that it is difficult to remove a compact from its mold without breaking, and sintering in a mold results in very short life of the mold. Being confronted with this problem over a long period of time, I finally conceived of a new method.

I take a 24 per cent phosphorus alloy in powdered form and mix with it powdered iron in the proportion of one gram of powdered alloy to 1.67 grams of iron powder. As a molding lubricant I add about 2 percent stearic acid. This composition is molded under a pressure of about 60,000 lbs. per sq. in. The resulting molded form is readily removed from the mold and handled. The strength of the molded form can be increased by sintering after removal from the mold, although for some sizes and applications this is not necessary.

The previously described molded form contains about 9 per cent phosphorus. To make a 10 per cent phosphorus composition I mix with one gram of the powdered alloy containing 24 per cent phosphorus, 1.4 grams of iron powder.

The inventive concept is my happy thought of intimately mixing the powdered iron alloy with ordinary powdered iron and placing the mixture under pressure, as explained in detail below.

In the accompanying drawings, Figs. 1 through 4 are detail sectional views of two forms of a pipe joint before and after brazing with a brazing form embodying my invention.

Figs. 1 and 2 show a sleeve joint which in this specific form is sometimes referred to as a bell and spigot joint. The end of the straight piece of pipe 41 fits snugly within an enlarged end portion 45 of the pipe 42. The space between the parts 41 and 45 is greatly enlarged for purposes of description and is indicated by the reference numeral 47. Actually there is a push fit between the end of pipe 41 and the enlarged portion 45 of the pipe 42. This clearance and the preferred tolerances is discussed in more detail in said patent.

Referring to Fig. 1 there is shown a ring 46 which is molded of a composition as previously described. The ring 46 is preferably an iron-phosphorus composition of 9 per cent phosphorus, this percentage being obtained by mixing powdered iron-phosphorus alloy of 24 per cent phosphorus with powdered iron in the ratio of 1 gram powdered alloy to 1.67 grams of powdered iron. This powder mixture with about 2 per cent stearic acid as lubricant is molded under a pressure of approximately 60,000 lbs. per sq. in.

The ring 46 is slipped over the pipe 41 and located next the end of the joint between this piece of pipe and the enlarged end 45 of the pipe 42. The temperature is raised by a furnace, by induction heating, or by a torch to a temperature between 2050 and 2100° F. Thereupon the ring 46 fuses and flows by capillarity throughout the space 47, forming a solid ring of sealing material 48 as illustrated in Fig. 2. The ring 46 is of such a size that it provides just enough material to fill the joint and form the circular fillets at the ends of the joint as illustrated in Fig. 2. The appearance of the fillets is visual assurance that the joint is completely sealed. Joints made in this fashion withstand internal pressures in excess of 2500 lbs. per sq. in. without leaking. Photomicrographs of a joint like that in Fig. 2 show that the material of the ring 46 penetrates by diffusion into the walls of the joint in addition to forming a sealing film in the joint itself.

In Fig. 3 is shown a modified form of the previously described joint between the pipes 41 and 42. Being of the same diameter these pipes are butted and a sleeve 49 is fitted over the joint, forming the characteristic reinforced joint section and capillary area. The previously described ring 46 of iron-phosphorus composition is located next one end of the sleeve 49. Upon fusion, the ring material distributes itself by capillary action throughout the joint and forms a solid seal 50 as shown disproportionately enlarged in Fig. 4.

Reverting now to the inventive concept mentioned at the beginning of this specification, an iron-phosphorus alloy of 10.2 per cent phosphorus has a melting point of 1922° F. which is satisfactory for brazing of iron at a temperature around 2100° F. The melting point of iron is in the neighborhood of 2700° F. wherefore the brazing temperature must be well below this value to avoid deformation of the iron parts being brazed. Iron-phosphorus alloys of lower and higher phosphorus content have higher melting points than the eutectic alloy of 10.2 per cent phosphorus. When I found that the compacting of the powdered eutectic alloy was impractical on account of the fragility of the compact, it looked like the end of this project. I did consider the inclusion of a binding material in a compact of the powdered alloy, but disliked this on account of the volume of binding material that would be required compared to the amount of actual brazing alloy in each compact.

I knew that I could bind the eutectic ferrophosphorus powder together into a compact by introducing sufficient iron powder to form a binding matrix, however, the quantity of iron powder necessary to afford sufficient practical strength would be sufficiently great to dilute the eutectic ferro-phosphorus (10.2% phosphorus), when it melted, to the extent that no flow would be obtained.

It seemed hopeless to use a higher phosphorus ferro-phosphorus alloy powder to gain a mixture of approximately eutectic proportions because with each added increment of phosphorus above the eutectic composition the melting point of the alloy would go up and the temperature necessary to melt it down would be impractical. For example, a 24% phosphorus ferro-phosphorus alloy has a melting point of about 2500° F. and I would have a compact made of iron which melts at some 2700° F. and 24% phosphorus ferro-phosphorus melting at some 2500° F. which would be much too high for practical use.

Then there flashed across my mind the possibility that such a compact made up of an intimate mixture of iron powder and high phosphorus ferro-phosphorus powder in the proper proportions to effect a mixture of approximately eutectic composition might work for I visualized that as the temperature of such a compact was increased there might be a diffusion of phosphorus from the tiny particles of the ferrophosphorus powder into the intimately adjacent tiny particles of iron powder, thus raising the phosphorus content of the one and lowering the phosphorus content of the other until both came to approximate equilibrium with each other at which point each particle should now be of approximately eutectic composition and the compact should melt at some 1922° F. and be usable at the known brazing temperature of the eutectic, namely 2050° F. to 2100° F. or thereabouts without ever having to heat the compact above about 2100° F. I tried it and it worked. This was a valuable discovery because I now had a compact that was strong enough to be handled, a compact that was all brazing material, and a compact that would melt and flow at the proper temperature. I have found the proportions of powdered alloy and powdered iron may be varied somewhat and yet produce satisfactory results. The reason may be that during the alloying action within the compact during increase in temperature, there occurs locally enough alloy of eutectic proportions to melt and carry with it other metal of the compact by capillarity into the joint being brazed.

Various change may be made within the scope of the invention as set forth in the following claim.

I claim:

Powdered alloy of iron and phosphorus having a relative phosphorus content greater than that in a eutectic proportion, and powdered iron mixed with the powdered alloy in such quantities that the relation of iron and phosphous in the whole mixture is substantially a eutectic proportion, the mixture being compacted to a form adapted for application as brazing material to a joint between iron parts.

BERNARD A. DALEY.

References Cited in the file of this patent

UNITED STATES PATENTS

| Number | Name | Date |
|---|---|---|
| 1,652,107 | Eschholz | Dec. 6, 1927 |
| 1,972,463 | Schlecht | Sept. 4, 1934 |
| 2,213,523 | Jones et al. | Sept. 3, 1940 |
| 2,226,520 | Lenel | Dec. 24, 1940 |
| 2,291,734 | Lenel | Aug. 4, 1942 |